(12) United States Patent
Little

(10) Patent No.: US 7,047,902 B1
(45) Date of Patent: May 23, 2006

(54) SOLAR CHARGED, ELECTRICALLY DRIVEN WATERCRAFT

(76) Inventor: Rolland N. Little, 3960 Chamberer Dr., San Jose, CA (US) 95135

( * ) Notice: Subject to any disclaimer, the term of this patent is extended or adjusted under 35 U.S.C. 154(b) by 214 days.

(21) Appl. No.: 10/601,830

(22) Filed: Jun. 23, 2003

Related U.S. Application Data

(60) Provisional application No. 60/390,127, filed on Jun. 21, 2002.

(51) Int. Cl.
*B63B 17/00* (2006.01)

(52) U.S. Cl. ............... 114/361; 114/61.1; 114/292

(58) Field of Classification Search ............ 114/61.1, 114/61.12, 343, 361, 211, 56.1, 292; 180/2.2
See application file for complete search history.

(56) References Cited

U.S. PATENT DOCUMENTS

| | | | |
|---|---|---|---|
| 3,090,339 A * | 5/1963 | Carr | 114/61.1 |
| 4,804,140 A | 2/1989 | Cantrell | |
| 4,991,532 A * | 2/1991 | Locke | 114/211 |
| 5,016,558 A * | 5/1991 | Oehler | 114/361 |
| 5,074,811 A | 12/1991 | Crisman | |
| 5,131,341 A | 7/1992 | Newman | |
| 5,131,888 A | 7/1992 | Adkins, II | |
| 5,197,291 A | 3/1993 | Levinson | |
| 5,221,891 A | 6/1993 | Janda et al. | |
| 5,236,378 A | 8/1993 | Newman | |
| 5,280,133 A * | 1/1994 | Nath | 174/52.1 |
| 5,289,999 A | 3/1994 | Naujeck et al. | |
| 5,725,062 A * | 3/1998 | Fronek | 180/2.2 |
| 5,787,833 A * | 8/1998 | Lewis | 114/211 |
| 5,931,114 A * | 8/1999 | Bartholomew | 114/361 |
| 6,000,353 A | 12/1999 | De Leu | |
| 6,021,862 A | 2/2000 | Sharan | |
| 6,073,569 A | 6/2000 | Motsenbacker et al. | |
| 6,105,524 A | 8/2000 | Dane | |
| 6,263,826 B1 * | 7/2001 | Key | 114/343 |

FOREIGN PATENT DOCUMENTS

GB  2 234 723 A  2/1991

\* cited by examiner

*Primary Examiner*—Lars A. Olson
(74) *Attorney, Agent, or Firm*—Edell Shapiro & Finnan, LLC

(57) ABSTRACT

A solar powered watercraft including a pontoon section, a strut section, a deck section, and a solar canopy section is provided. The canopy section comprises a headliner layer, a ventilation space, and means for receiving solar radiation. The solar canopy may further comprise a means for flowing air through the ventilation space that includes a fan, a thermostatic switch, a photocell, air inlet ports, and air exhaust ports. The aft section of the pontoon, moreover, may possess a dual tapered design that reduces water friction and wake. The watercraft further includes means for containing a battery pack that, in turn, comprises means for removing heat and gaseous byproducts from the containing means. The containing means is either made integral with the pontoon or is attached to the pontoon's outer surface. The watercraft may possess an aft-oriented trim, which stabilizes the craft and reduces the effect of water forces.

26 Claims, 14 Drawing Sheets

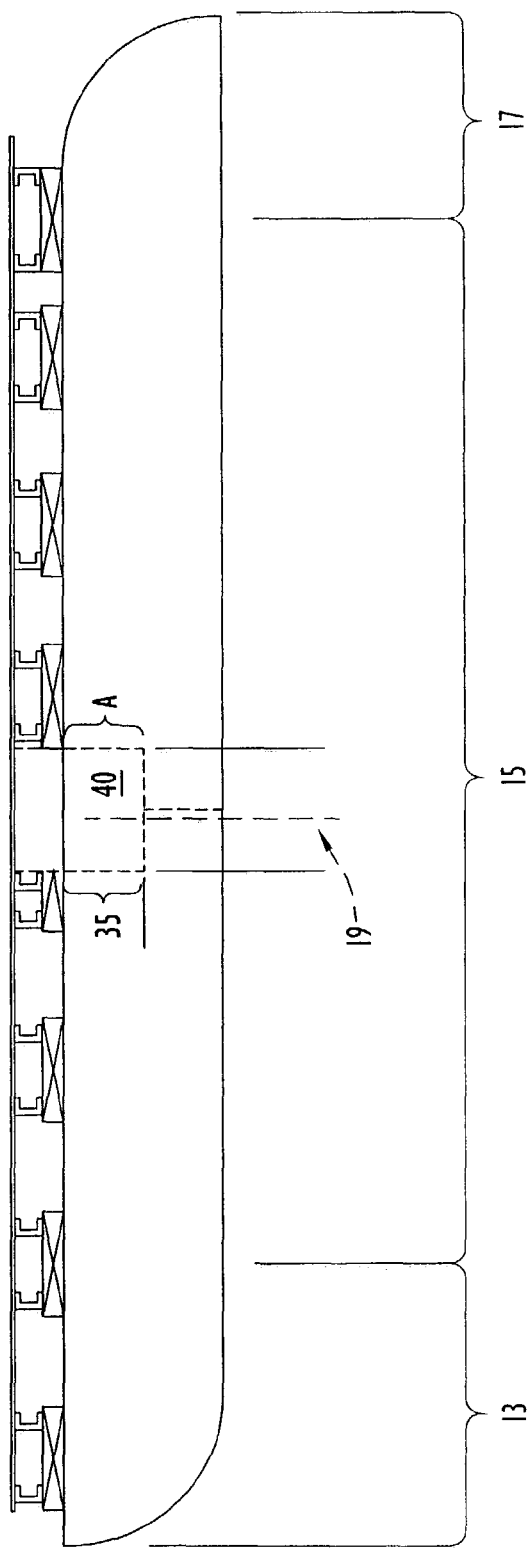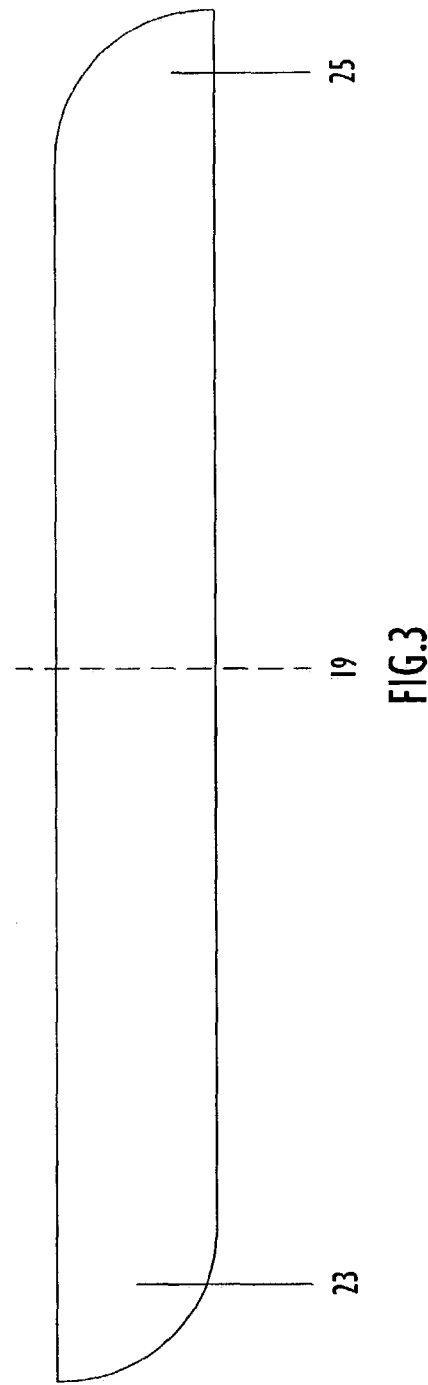

LOW-DRAG PONTOON REAR CONE

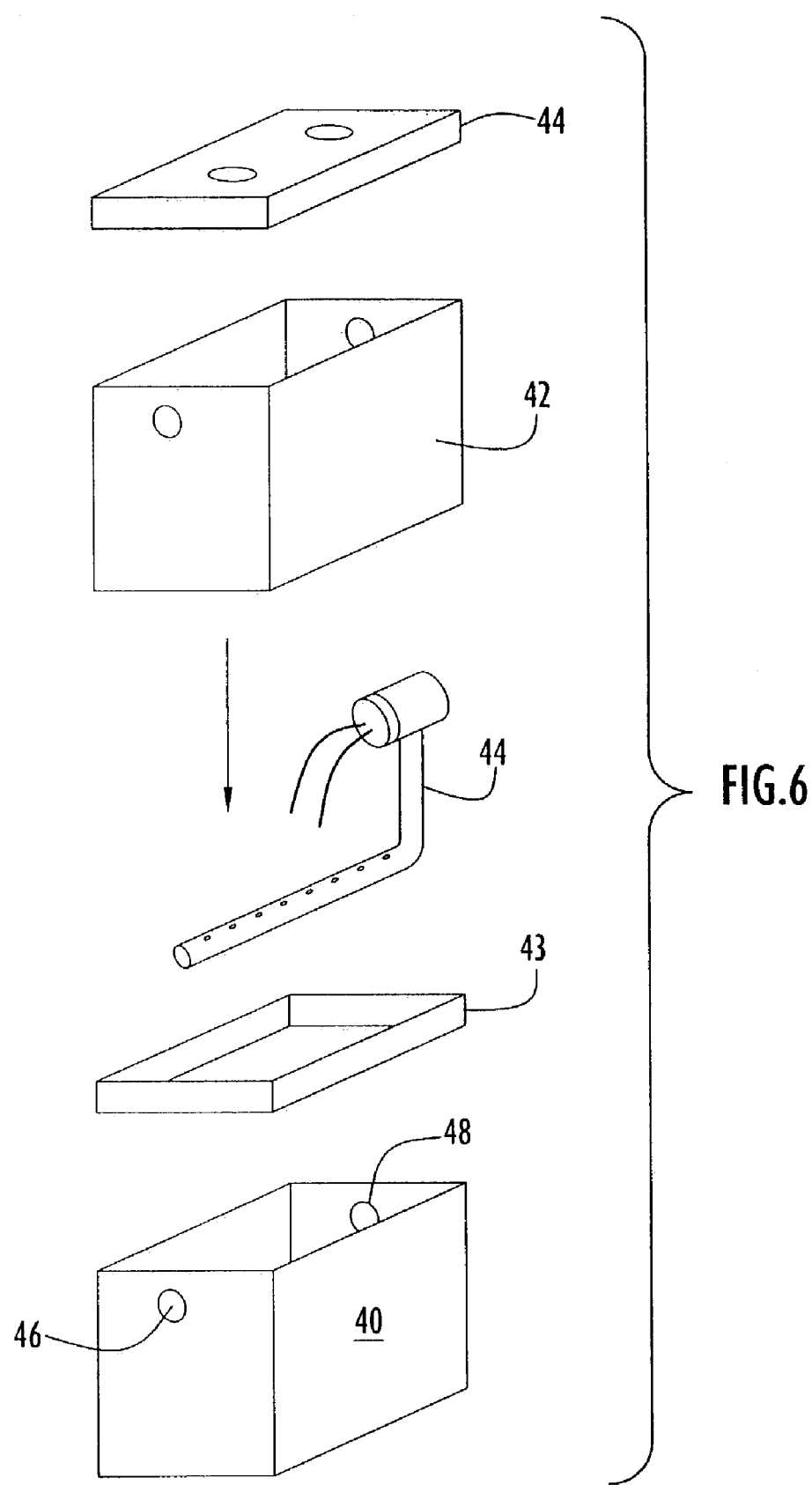

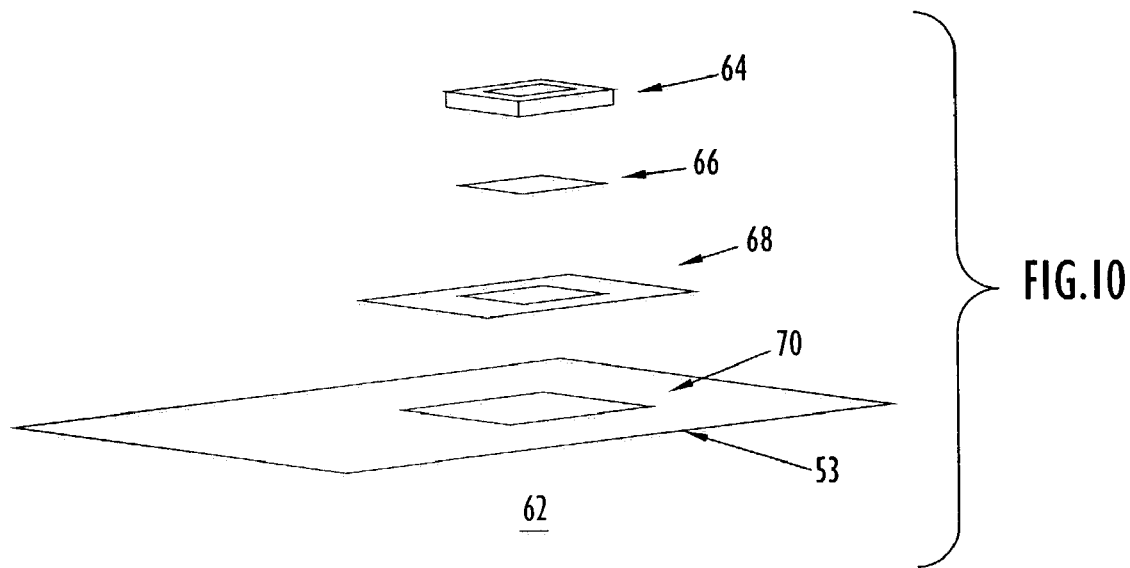
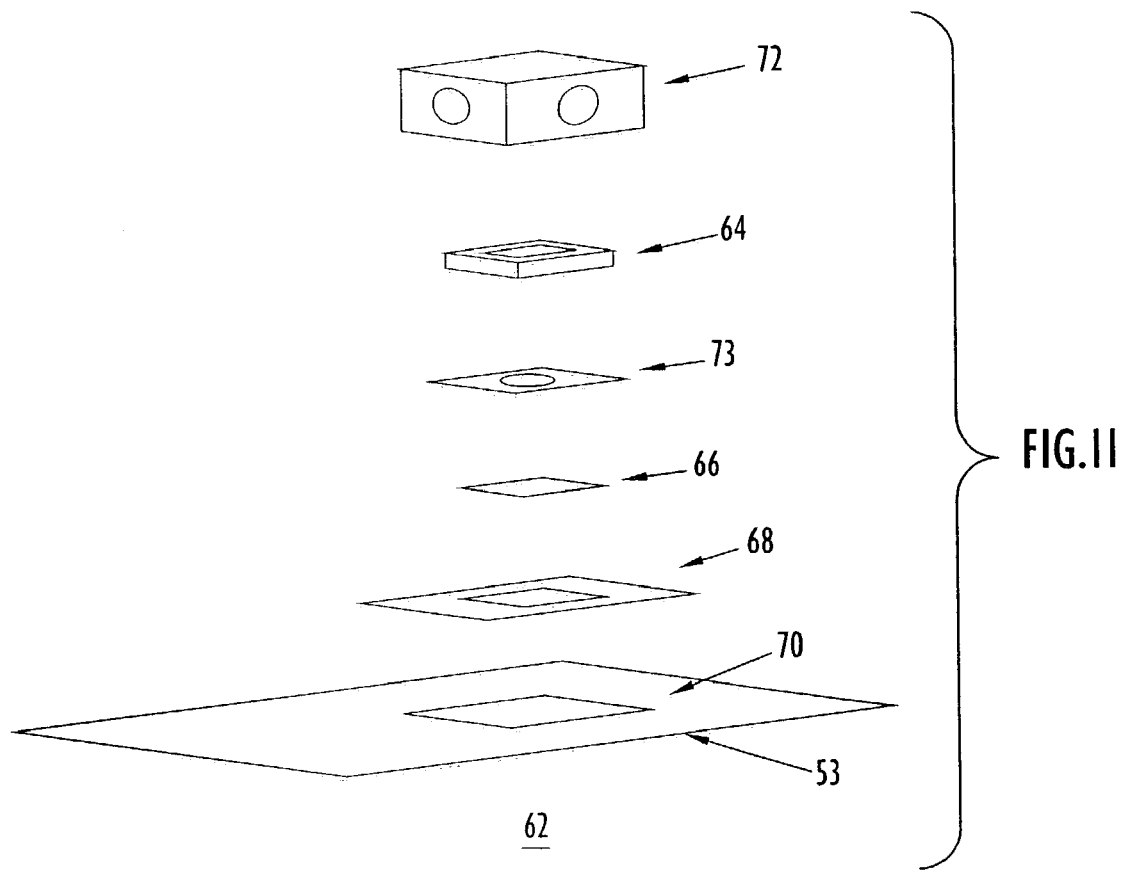

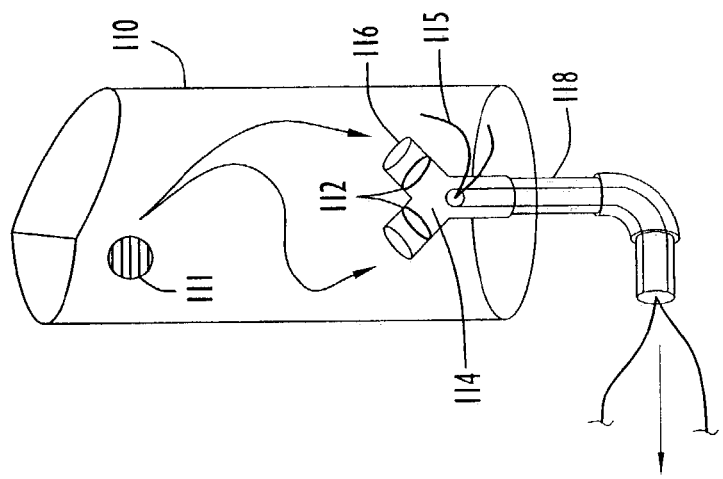
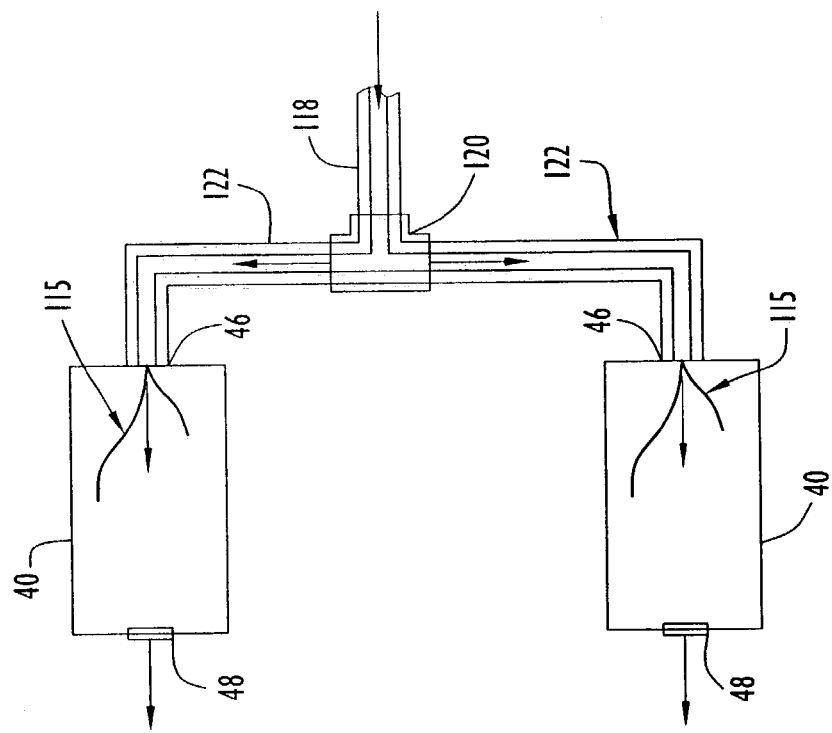
FIG.15

SOLAR CHARGED, ELECTRICALLY DRIVEN WATERCRAFT

CROSS REFERENCE TO RELATED APPLICATIONS

This application claims priority from U.S. Provisional Patent Application Ser. No. 60/390,127, entitled "Solar Boat Cooling and Exhaust System" and filed Jun. 21, 2002. The disclosure of the above-mentioned provisional application is incorporated herein by reference in its entirety.

BACKGROUND OF THE INVENTION

1. Technical Field

The present invention pertains to a cooling and exhaust system for boats. In particular, the present invention pertains to a cooling and exhaust system for a solar-powered pontoon boat.

2. Discussion of the Related Art

U.S. Pat. No. 5,131,341 (Newman) discloses a system for distributing electric power on a sailing ship using arrays of photovoltaic cells covering the ship's sails and rigging to generate electric power during daylight for the purpose of driving a ship's screw. The solar array electric power output is processed by a voltage regulator that charges a large capacity storage battery and energizes an electric motor to drive the ship's screw.

U.S. Pat. No. 5,289,999 (Naujeck et al.) discloses solar cells arranged on a supporting structure. Several solar cells are parts of a frameless solar cell element in which the solar cells are enclosed next to one another between filmstrips or panels. The side of the laminate that faces the sun is flat and transparent. The solar cell laminate lies on a support structure comprising two covering layers and a supporting foam layer between the covering layers. The support possesses an undulating structure between two parallel edge sections.

U.S. Pat. No. 6,000,353 (De Leu) discloses a pontoon raft having a hand-controlled steering mechanism and solar cells for powering an outboard electric motor. A seat of a chair having an adjustable rack to form a raft interconnects a pair of pontoons to each other. Each pontoon has a flat, upwardly facing surface used as armrests, with one of the pontoons carrying a control panel. Both pontoons have photovoltaic cells located on the flat surfaces of the pontoons. The cells are either connected to a battery located within one of the pontoons, or to the control panel. An electric motor with a propeller at the end of the vertical shaft is positioned rearward of the chair and is supported by a tube attached between the rear of the pontoons.

U.S. Pat. No. 6,073,569 (Motsenbacker et al.) discloses an electric powered watercraft comprising a power mass enclosed in one or two torpedo-like structures that are mostly or completely submerged. The structures are combined with at least one enclosed float having a convex shape. A platform is spaced above the floats via struts.

U.S. Pat. No. 6,105,524 (Dane) discloses a pivoting sailing rig adapted for use on a watercraft including a frame with spaced apart, primary shafts which are oriented to rotate and move axially along axes which are generally parallel to the centerline or fore-aft axis of the watercraft. Wing sails are mounted on coupling elements secured to the primary shafts. The wing sails may include solar collectors mounted thereon and may be oriented in use to take advantage of the wind as well as sunlight conditions to optimize sailing as well as energy collection.

G.B. Published Patent Application No. 2,234,723 (Crafer) discloses a vessel including a stowable rigid wingsail system comprising a wingsail unit consisting of three rigid wingsails mounted between a boom and a yard, which are simultaneously rotatable 180 degrees by means of track rods connected to each wingsail. The face of the wingsails may further comprise built-in photovoltaic panels to supply electric power for the vessel.

Early outboard motors for boats were electrically powered. Originally, electric engines were more reliable than gasoline engines; however, the technology of gas engines improved at a faster rate, providing more horsepower and reliability than electric engines. Eventually, the state of the art was such that electric engines could not compete with gasoline engines. The increased performance aspects of gasoline engines provided boat users with the thrill of speed and the ability to travel long distances. Eventually, the production of electric boats diminished, while the production of gasoline and diesel powered motors soared.

Unfortunately, the success of gasoline powered boating has brought environmental damage to the very waters and ecosystems that support the enterprise. Furthermore, as people have exploited all possible pleasures of high speed boating, their interests have returned to electric boating. Environmental repair to water and areas of boating has been accommodated by the removal or restriction of gasoline powered boats and the promotion of electric boats.

Electric boats, however, still present engineering challenges. Electric boat motors consume large amounts of DC power to move a load over water. The amount of load and time between needed battery charging is in part dependent upon battery size, weight and capacity. The weaknesses in the present state of the art of electric boats are becoming evident as interest in their use increases:

(1) They require the use of AC electrical wires on or near the water for recharging;

(2) The battery housing area provides potential for electrocution or serious burns;

(3) Battery placement on the deck and hull areas restricts passenger activity;

(4) Existing electric power sources that are capable of providing energy for a full day of boating activity are limited to traveling at slow speeds due to battery weight and stability limitations;

(5) Increasing battery mass to increase power is not practical because it either slows the boat or, when the battery is stored on the deck, increases boat instability;

(6) Existing electric power sources for boats do not provide enough energy for convenience items; and (7) Existing electric boats require new maintenance and boating skills.

The present invention provides a watercraft powered by an electric motor that is continuously recharged using solar power. A typical solar power system comprises solar panels, batteries and electronic controllers. Heat is a by-product of radiation and the operating characteristics of electronic controllers and batteries. Solar electric panels produce highest levels of electric current at periods of cool temperatures and high solar radiation. Consequently, removing heat from the system increases the efficiency of electrical production and the rate of battery charge. However, the means used to increase current, capacity and battery longevity must provide a net gain over the consumption of power utilized by the cooling and exhaust system.

OBJECTS AND SUMMARY OF THE INVENTION

Accordingly, it is an object of the invention to provide an electrically driven, solar charged watercraft.

Another object of the invention is to provide an innovative solar canopy ventilation system.

Still another object of the invention is to provide a pontoon that reduces water drag by having a dual-tapered design.

Yet another object of the invention is to provide a pontoon including an interior battery box construction.

It is also an object of the invention to provide a battery box having air inlet and air exhaust ports.

Another object of the invention is to provide a watercraft capable of housing large battery weights.

It is also an object of the invention to provide a watercraft having an aft-oriented trim.

It is a further object of the invention to provide a watercraft having a higher production of solar electric current, increased efficiency of the charge controller, and a system for removing not only heat from the battery pod, but the out-gases generated by a re-charging cycle.

The aforesaid objects are achieved individually and/or in combination, and it is not intended that the present invention be construed as requiring two or more of the objects to be combined unless expressly required by the claims attached hereto.

According to the present invention, an electrically driven, solar charged watercraft includes a pontoon section, a strut section, a deck section, and a solar canopy section. The canopy section comprises a headliner layer and a solar panel layer, spaced by a ventilation area. The solar canopy may further comprise a ventilation system having a fan, a thermostatic switch, a photocell, air inlet ports, and air exhaust ports. The aft section of the pontoon, moreover, may possess a dual tapered design that reduces water friction and wake. The watercraft further includes an innovative battery box design wherein heat and gaseous byproducts are removed from the battery area. The battery box is either made integral with the pontoon, or is attached to the pontoon's outer surface. This battery box system can be used to create an aft-oriented watercraft trim that stabilizes the craft and reduces the effect of water forces on the craft.

Each innovation results in a system that provides battery longevity and faster charging rate due to an increase in voltage. Specific benefits include:

(1) The use of a 120v AC power is not required due to the use of a solar canopy in combination with a solar charge converter;

(2) The battery box provides a secure location for high current batteries;

(3) The battery box provides a mechanism by which batteries are placed within pontoons. The heavy weight of a battery, once a disadvantage, can advantageously be used to lower a watercraft's center of gravity and increase its stability which, in turn, permits the use of additional battery weight;

(4) The ability to use an increased battery weight provides systems having greater horsepower and sufficient energy for a full day's boating activity, as well as systems that are inverter capable;

(5) The battery box with ventilation, one way exhaust, and support plate assembly can be inserted as an individual support component into other manufacturers' pontoon boats, or can be made integral with various-sized pontoons, providing manufacturers with an efficient production method for offering electric storage capacity without altering their production boat styles;

(6) The battery box and ventilation assembly can be used as a pre-manufactured live well, accessible from the deck as well as from a secured storage area;

(7) The battery box and ventilation assembly can be used as a secured storage area;

(8) Placement of the battery below the deck provides designers and passengers with full use of the deck.

(9) An automatic electronic ventilation system and solar power system automates maintenance—it is only necessary to manually maintain the batteries (e.g., by the addition of water); and

(10) The use of an electric outboard motor in combination with a lower center of gravity permits the use of a steering wheel instead of a tiller.

The above and still further objects, features and advantages of the present invention will become apparent upon consideration of the following detailed description of specific embodiments thereof, particularly when taken in conjunction with the accompanying drawings, wherein like reference numerals in the various figures are utilized to designate like components

BRIEF DESCRIPTION OF THE DRAWINGS

FIG. 2 is a side view in elevation of the pontoon of the watercraft in FIG. 1.

FIG. 3 is a schematic diagram showing the centerline of flotation and its relation to the general pontoon structure.

FIG. 6 is an exploded view in perspective of the preferred embodiment of the battery box of the present invention.

FIG. 10 is an exploded view in perspective of one preferred embodiment for an intake port according to the present invention.

FIG. 11 is an exploded view in perspective of another preferred embodiment for an intake port according to the present invention.

FIG. 15 is a flow diagram of the battery ventilation system including the control console and battery bays.

DETAILED DESCRIPTION OF THE PREFERRED EMBODIMENTS

Figure 1:
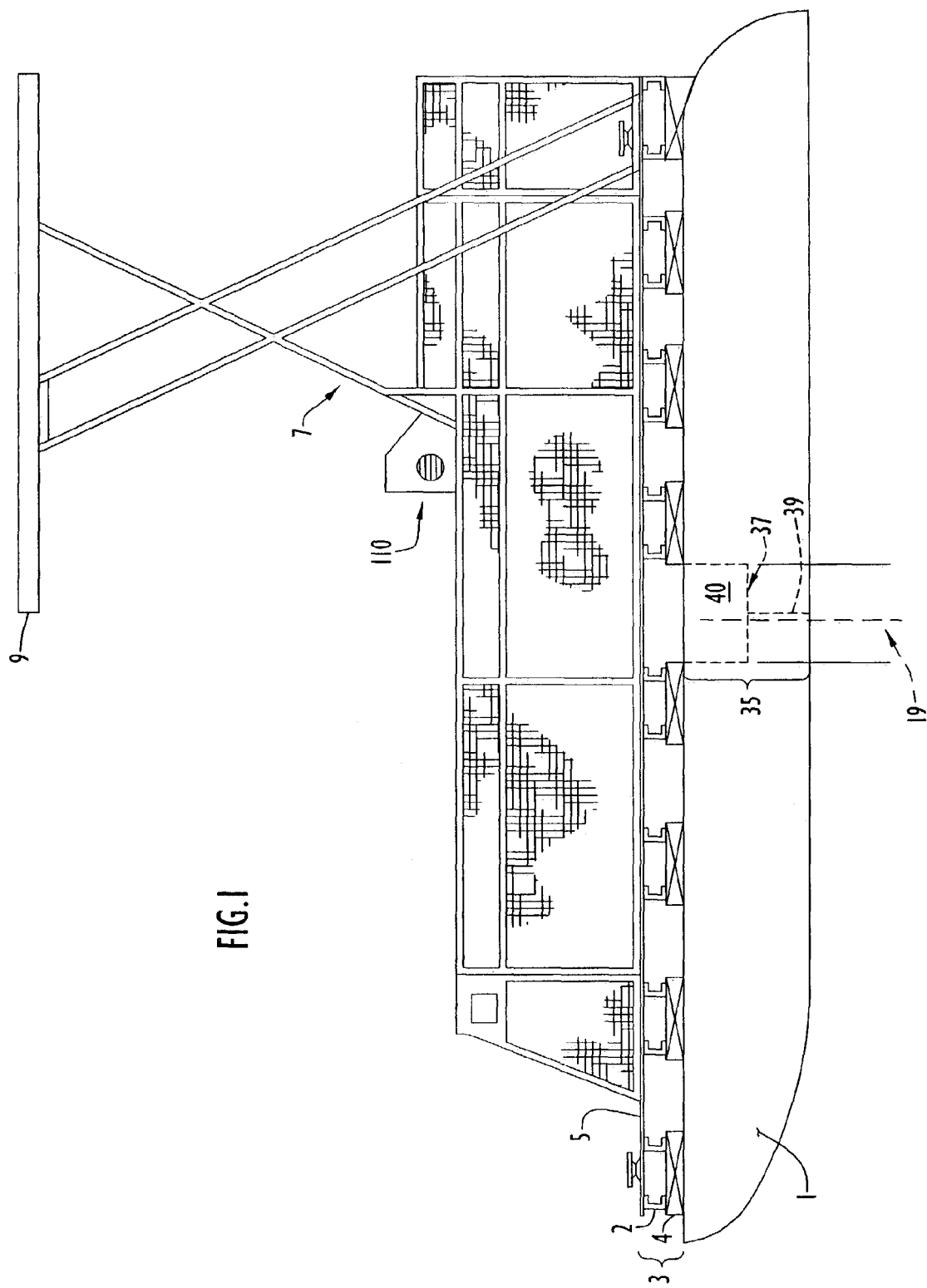
FIG. 1 is a side view in elevation of the general structure a pontoon watercraft of the present invention.

The electric watercraft of the instant invention is shown in FIG. 1. Generally, the watercraft generally comprises a pontoon section 1 secured beneath a craft body including a deck section 5 by means of a strut section 3 including multiple spaced joists 2 and brackets 4. The strut section may further include a motor mounting bracket (not shown). In the embodiment shown: in the figure, the pontoon section 1 further comprises a battery box 40 located in battery bay 35. Supporting plates 37, 39, support the battery box 40 in a position about the pontoon center of flotation 19. A control console 110 is located on the deck 5. A solar canopy 9 including a ventilation system is supported above the deck 5 using a canopy supporting means 7. The supporting means 7 is conventional in the art and typically comprises a lightweight metal such as aluminum, but other coated or uncoated metals (e.g., chrome or stainless steel) may be used. A particularly preferred embodiment comprises hollow aluminum tubing (either square or round) having a diameter of about two inches.

Pontoon Section

The number of pontoons used for the watercraft depends on the desired deck size, the intended passenger/load weight, and the desired traveling speed. Though the number is not particularly limited, the use of two pontoons is preferred to minimize the effect of drag while optimizing the stability of the craft. The pontoon may possess either a rounded or U-shaped configuration. As shown in FIG. 2, a pontoon 11 comprises a forward (fore) section 13, an intermediate section 15, and a rear (aft) section 17. Located within the center section is the flotation centerline 19. The flotation centerline is the point 21 halfway between the location 23 at the fore of the pontoon where the diameter is 75% of the full pontoon diameter and the location 25 at the aft of the pontoon where the diameter is equal to or greater than 80% of the full pontoon diameter. An example of the centerline of flotation is illustrated in FIG. 3. As can be seen, the centerline 21 lays between the fore location 23 (where the diameter at this location is 75% of the full pontoon diameter) and the aft location 25 (where the diameter at this location is equal to or greater than 80% of the full pontoon diameter). In typical configurations, the pontoon of the instant invention has a rounded or U-shaped center portion and terminal (end) portions. The end portions have configurations similar to that of the right-side-up bow of a canoe. Though these configurations lessen the effect of drag on a watercraft, the inventor has determined that the effect of frictional forces can be reduced more effectively by using a pontoon that has two tapers (rearward and downward) at its rear (aft) portion.

The surface area of a pontoon determines its ability to support structures above the water surface. A pontoon provides lift via water displacement. Since electric boats do not travel fast enough to plane above water, a pontoon boat travels more efficiently when frictional forces are reduced along its surface. Friction on a pontoon watercraft is most readily observed along the sides and rear of the pontoons (i.e., the areas in contact with the water's surface). As a pontoon moves forward, it is dragged or pushed through the surrounding water. Water at the rear clings to the terminal edge of the pontoon and must be shorn off and replaced by more water until the pontoon comes to rest. This clinging effect produces drag that resists the forward movement of the pontoon. For this reason, minimizing drag enables a pontoon to travel faster, travel farther, carry more load, and conserve more energy.

Figure 4:
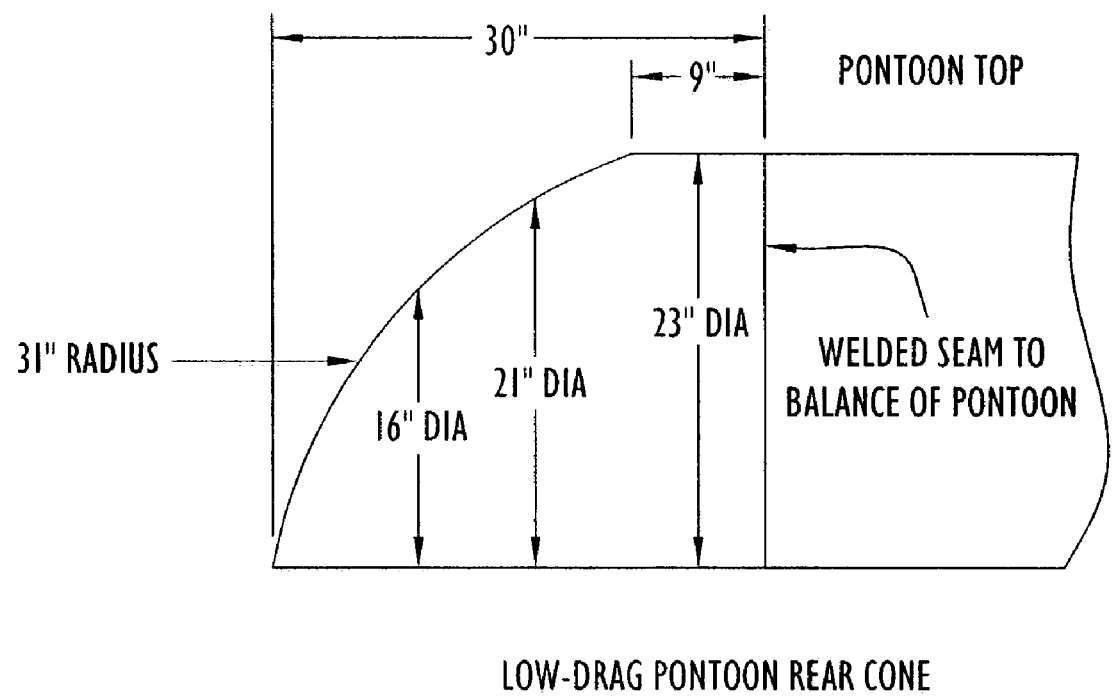
FIG. 4 is a detailed side view in elevation showing the dimensional contour of the rear of the pontoon of FIG. 2.

In a preferred embodiment of the instant invention, the watercraft comprises a pontoon having a forward section, an intermediate section, and an aft section. The forward section includes a terminal end having a forward taper that defines a water cutting edge. The aft section, moreover, includes a terminal end having two separate tapers. As shown in FIGS. 2–4, the aft end of the pontoon is tapered both downward and rearward such that it resembles an end of an upside-down canoe. This creates a pontoon that effectively slices into water at the front and draws the water together at the rear. Specifically, the forward (fore) taper edge directs the side flow of water around an exaggerated curve in the pontoon profile. The flow is then directed along the aft taper in both a downward and rearward direction, where it meets an edge at the rear centerline of the pontoon. With forward motion, this aft edge runs below the surface during operation and, much like a field plow, effectively opens a low-pressure region or vacuum hole at its base into which the surrounding water is aspirated. Consequently, the two-taper design reduces the surface area on which water may cling and cause drag. This design reduces wake, and is designed to work at the various levels of submersion which occur when the watercraft lists (tilts) to the rear or when loads are applied to the rear of the craft.

The material comprising the pontoon is any buoyant material. A preferred material is aluminum.

Battery Box/Tray Placement within Pontoon Section

To provide an electric watercraft that travels faster or farther, it is necessary to manipulate the size, weight, and location of the battery pack. Due to battery construction materials, batteries, for their size, are very heavy. In order to provide an electric watercraft with sufficient power, it is necessary to provide a large battery pack. To compensate for this size, battery packs have traditionally been placed on the deck of a watercraft. Doing so provides ample space for large packs; however, this creates a craft having a high center of gravity, which affects the trim (equilibrium) of the craft. The trim of the watercraft is also affected by the number and location of passengers on board. Passengers typically sit near the front of the craft while it is in motion, creating a fore-oriented (front-oriented) trim. This trim imbalance increases the likelihood that the front of the craft will submarine during use, as well as the likelihood that the front of the ship will plow water (instead of cutting through it). When either occurs, increased drag results. Increased drag, in turn, results in an additional drain on battery resources.

Figure 5A:
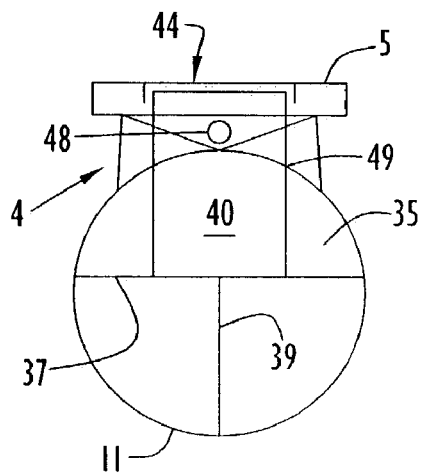
FIGS. 5a, 5b, 5c, and 5d are schematic diagrams of the different battery box configurations mounted on various pontoon shapes.
Figure 5B:
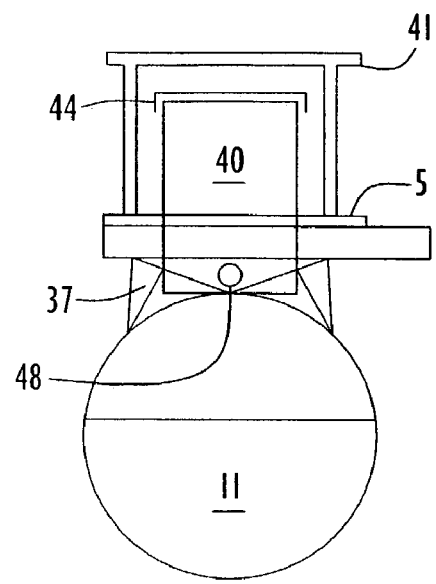
Figure 5C:
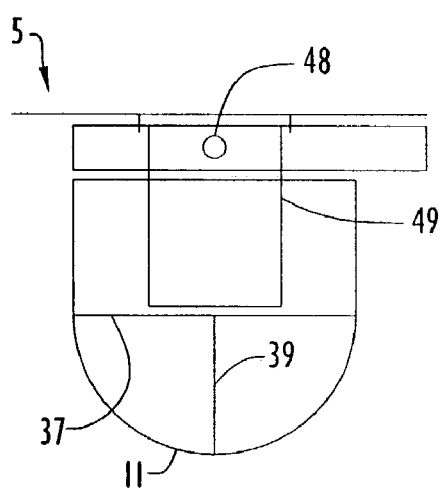

The present invention avoids these problems through innovative pontoon configurations. These configurations use the weight of the battery pack advantageously to provide a craft that possesses more deck space and a lower center of gravity which, in turn, creates a more stable trim. This configuration, moreover, permits the use of large battery sizes. A preferred configuration includes a means for containing a battery pack, e.g., a battery box. FIGS. 5a–5d illustrates the various configurations of the pontoon 11 and the battery box 40. As can be seen, the pontoon 11 may be either rounded (FIGS. 5a, 5b) or U-shaped (FIGS. 5c, 5d) and the battery box 40 may be mounted either on the exterior surface of the pontoon (i.e., it may have an external configuration)(FIGS. 5b, 5d) or may be mounted at least partially inside the pontoon (i.e., it may have an internal configuration)(FIGS. 5a, 5c). The internal configuration is, for the most part, the preferred configuration.

The battery box houses the battery packs used to power the watercraft. Referring to FIG. 6, the battery box 40 typically comprises a lightweight material. Preferably, box 40 comprises the same material as the pontoon, with aluminum being particularly preferred. A non-reactive liner 42, 43 may be applied to the interior of the box 40 to prevent battery acids caused by battery out-gassing from destroying the box 40. A preferred example of material for the non-reactive liner is polypropylene.

Figure 7:
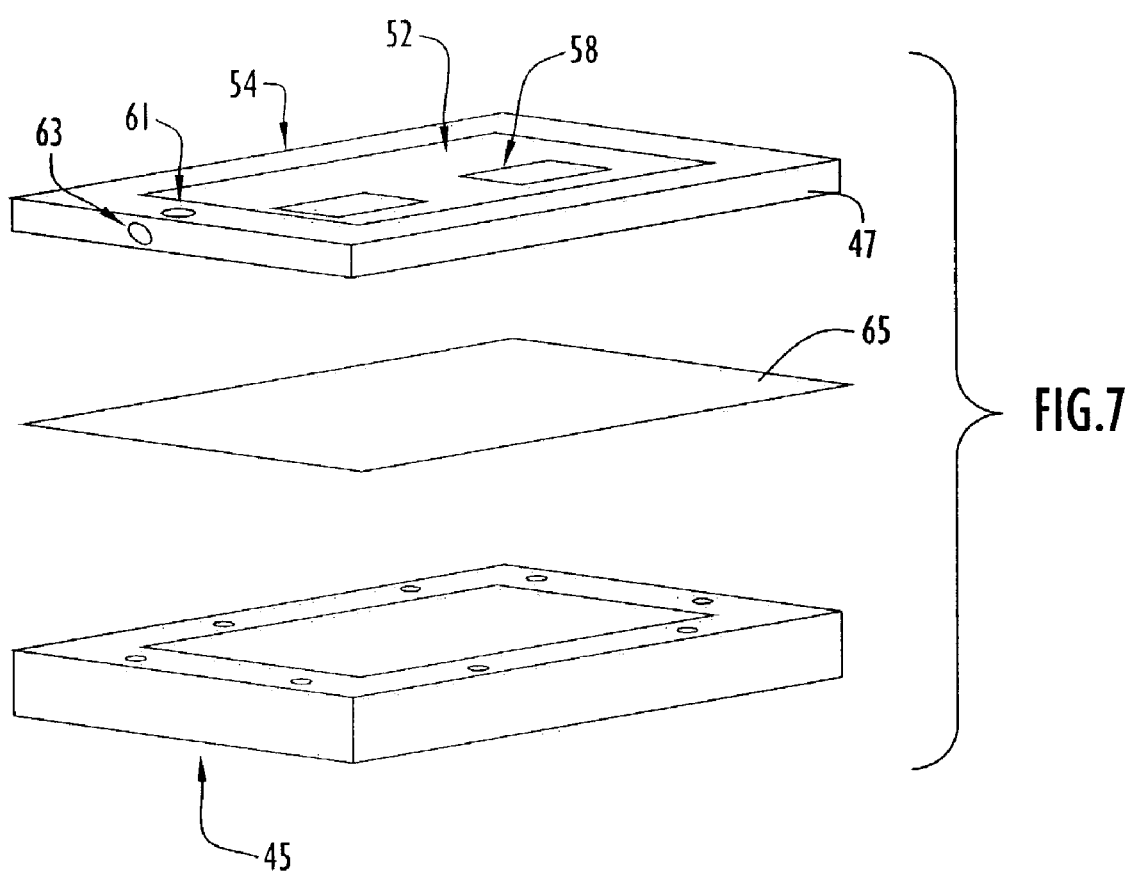
FIG. 7 is an exploded view in perspective of the lid of the battery box of FIG. 6.

In addition, the battery box 40 comprises a locking lid 44 shown in detail in FIG. 7. The lid comprises a frame 45 having a lipped structure whose lower surface contacts and seals the battery box 40. The frame comprises the same material as that comprising the battery box, e.g., aluminum, with aluminum angle iron particularly preferred. The dimensions of the frame are not limited. Battery box top 47 is attached onto the upper surface of frame 45. Box top 47 preferable comprises deck material 52 partially wrapped in the same material as that comprising the frame, e.g., aluminum angle iron. The thickness of box top 47 is preferably about ¾ inch. This partial wrapping creates an edge portion 54 along the perimeter of box top 47. Non-reactive liner material 65 may be applied to the underside of lid 44. The lid further comprises a locking means such as a lock pin 63 and a lock 61 that, when in a locked position, securely engages frame 45 to enable the secure containment of the battery packs.

Figure 5D:
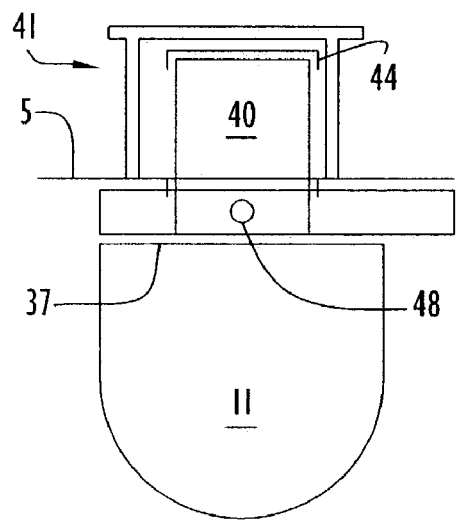

Referring back to FIG. 6, the box 40 preferably comprises a means for air outlet 48 (e.g., an air exhaust port) and a means for air inlet 46 (e.g., an air inlet port). The exhaust port 48 is located at either the front or the exterior front side of battery box 40. As shown in FIG. 5b or 5d, when the external mounting configuration is used, exhaust port 48 is located at the lower portion of box 40. When the internal mounting configuration is used (FIGS. 5a, 5c), moreover, exhaust port 48 is located at the upper portion of box 40. In either configuration, inlet port 48 is preferably located on the rear side (i.e., the side closest to the stern of the watercraft) or the rear interior side of box 40. Locating the air inlet port 48 at the rear of box 40 and the exhaust port 46 at the front of box 40 takes advantage of the convection currents existing within box 40, especially when the craft possesses an aft orientation. Typically, the ports 46, 48 are lined with a fitting such as a polyvinyl chloride (PVC) fitting (not shown). The size of the ports is not limited, but is preferably about one to two inches in diameter. The ventilation manifold, present in the battery box, is discussed infra.

The size and shape of the box vary based on the size of the battery packs and the number of pontoons available. In general, the size of the box is calculated by determining the space required to house the battery pack and cables, as well as provide space to accommodate unencumbered cooling airflow over the top of the batteries. Generally, about two inches of space above the battery posts/cables is sufficient. In a preferred embodiment, the box is a rectangular-shaped block having a length of about 25 inches, a width of about 15 inches, and a height of about 20 inches. This size will accommodate most battery size needs. If smaller battery packs are used, a smaller box may be provided, or lightweight blocks may be used to secure a battery pack into a desired location.

As seen in FIGS. 5b and 5d, when an external mounting configuration is used, the battery box 40 sits on the surface of the pontoon 11. The box protrudes above the deck 5, and is concealed by a furniture item on the deck, e.g., a bench 41.

When the battery box 40 has an internal configuration (FIGS. 5a, 5c), a battery bay 35 is provided. The bay 35 is formed by cutting an upper surface piece from the pontoon, wherein the piece is sized just large enough to enable the installation of the battery box. The battery bay is preferably placed near the centerline of flotation of the pontoon. When the battery bay has a rectangular block shape, a particularly preferred placement is such that length of the battery bay from the pontoon's centerline of flotation to the aft end of the bay (and thus the aft end of the pontoon) is greater than the length of the battery bay from the centerline of flotation to the fore end of the bay. In other words, the bay is slightly off longitudinal center, being oriented slightly closer to the rear of the pontoon.

The battery box 40 is supported by a battery box support plate 37. The support plate 37 is attached to the interior sides of the pontoon battery bay 35. The preferred attaching means for support plate 37 is welding. Furthermore, a vertical support 39 may be fitted beneath the battery box support plate 37 to provide support during highway transport or rough water conditions. Vertical support 39 is attached to the underside of support plate 37 and to the lower pontoon interior using an attaching means such as welding. Support plate 37 and the vertical support 39 typically comprise the same material as the pontoon, with aluminum being preferred. Particularly preferred is aluminum having a thickness of about ¼ inch. The depth of the battery bay support plate 37 within the pontoon 11 is the distance from the bottom of the deck 5 to the top of the pontoon 11, subtracted from the height of battery box 40. In FIG. 2, this distance is illustrated as distance A. The size of battery box 40 is slightly smaller (less than about ½ inch smaller) than the access hole cut into the pontoon surface to create the battery bay. Battery box 40 is further secured to the pontoon by attaching (e.g., by welding) the sides of the box to pontoon 11 at the seam where the box enters the pontoon. This weld is generically indicated at 49 in FIGS. 5a and 5c. Though the shape of the bay is not limited, the preferred shape of the battery bay is a rectangular block.

When the internal mounting configuration is used, locking lid 44 of battery box 40 is flush with the top of the deck 5. This provides the additional benefit of optimizing deck space. Electric boats typically store batteries on the exterior surface of a deck, e.g., under a seat bench. Not only does this minimize the storage space of the craft, but also decreases the deck space available to passengers. This also presents an increased electrocution hazard because bench lids are accessible to passengers, increasing the likelihood of passenger contact with the battery pack. Placing the battery packs inside the pontoon maximizes deck and storage space while minimizing electrocution hazards and injuries by providing a secure, locking box located away from passengers.

Aft Orientation of Trim

The internal or external battery box mounting configurations can be used to provide the additional benefit of creating a watercraft having an aft-oriented trim. An aft-oriented trim is created when more than 50% of the total weight of a battery pack is placed in or on the aft portion of the pontoon. The aft portion of the pontoon is defined as that portion of pontoon lying aft of a pontoon flotation centerline (defined, supra). The exact placement of the battery box, and thus the battery weight, depends upon the desired degree of listing, as well as the location and weight of peripheral materials (e.g., furniture) located on the deck of the boat. In a preferred embodiment, 40% of the battery box length is placed forward of the flotation centerline, with 60% of the battery box length to the rear of the centerline. For example, in the embodiment where the battery box is 25 feet in length, 10 feet of the length should lie forward of the centerline, and 15 feet should lay aft of the centerline.

When more than one pontoon is present, each of the pontoons must be aft-oriented. Providing a watercraft aft orientation reduces the likelihood that the craft will submarine and plow. In addition, aft orientation improves the convection currents of both the battery box and canopy ventilation systems.

When more than one pontoon is present, the craft may be further stabilized by distributing the weight of the battery packs evenly among the pontoons. Placing batteries on only one side of a watercraft (e.g., the port or starboard side) destabilizes the trim of the craft. When the craft is subjected to side-rolling waves (i.e., waves approaching from the right or the left), rollover is possible. Dividing the weight of the batteries evenly among pontoons creates a craft having a more stable transverse trim.

As a result of (1) placing the battery box on the pontoon such that the majority of the weight of a battery pack is aft oriented, or of (2) placing the battery box in a battery bay such that the majority of the weight of the battery pack is aft oriented, the watercraft will list (tilt or pitch) to the rear. This improves the energy efficiency of the craft by improving canopy ventilation and minimizing the effect of water forces. When the craft is at rest, the aft-oriented trim improves the ventilation of the canopy system because the convection currents move heated air towards the higher, front portion of the canopy, where the air escapes. When the boat is in motion, the rear listing improves the stability of the craft because the rear of the craft is more submerged than the front. At typical speeds (less than about 10 miles per hour), pontoon crafts do not plane above water. This, as discussed above, increases the risk of submarining and plowing. In addition, when the internal mounting configuration is used, the center of gravity is lowered, increasing the stability of the craft. Increasing stability and reducing the effect of water forces on the watercraft improve battery performance since the batteries do not have to supply energy to compensate for these disturbances. The aft-oriented trim design as well as the internal mounting configurations are marked improvements over the prior art for it uses the weight of the battery pack address these problems.

Strut Section

Figure 8:
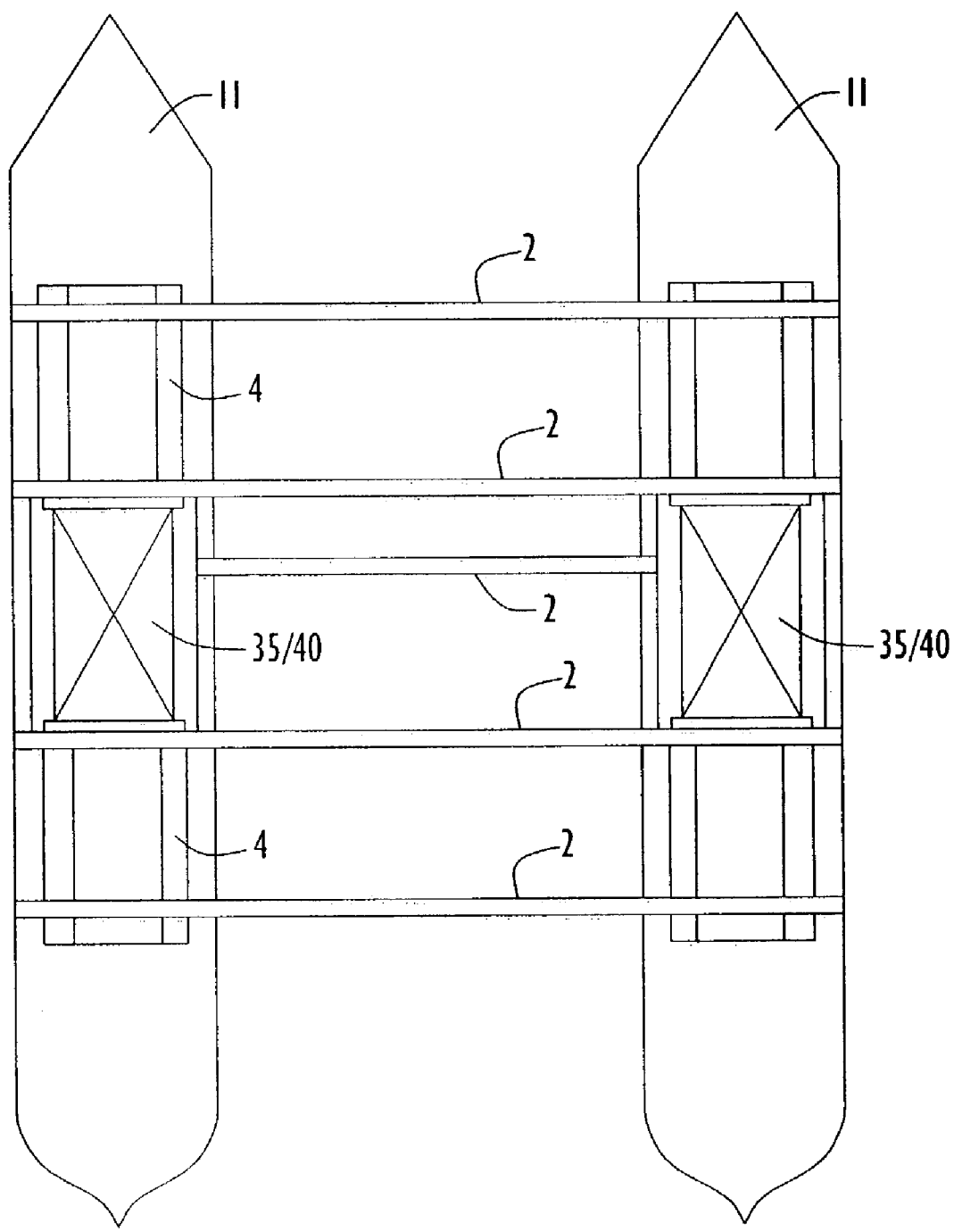
FIG. 8 is a top view in plan of the strut section of the watercraft of FIG. 1 showing its relation to the pontoon and battery boxes.

Referring again to FIG. 1, the strut section 3 of the watercraft comprises a means for supporting the pontoon section 1 from the undersurface of the boat deck 5. An overview of the strut section can be seen in FIG. 8. The supporting means are within the ordinary skill of the art, and include joists, brackets, or both. Referring to the preferred embodiment of FIG. 8, both joists 2 and brackets 4 are used, with brackets 4 attached to pontoon section 1 and joists 2 attached to brackets 4. It is important that brackets 4 and joists 2 are spaced to provide ample space for the placement of battery box/bay 35/40. The preferred joist configuration is a C-joist. In particular, C-joists having a size of about three inches, which run the width of the watercraft and are spaced about 16 inches apart, are preferred. The preferred bracket configuration is an M-bracket. In particular, M-brackets having a length of about 24 inches are preferred. The number of brackets required depends on the length of the pontoons 11 and deck.

Craft Body Section

As seen in FIG. 1, the body of the watercraft includes a deck section 5. The composition or thickness of the deck 5 is not particularly limited. It may comprise any material sufficient to support the desired passenger or cargo weight. Those of ordinary skill in the art are generally aware of such materials. The deck, for example, may comprise materials such as wood, plastic, or fiberglass. A preferred example is plywood having a thickness of about ¾ inch. The length and width of the deck, moreover, is not limited, and may be adjusted to accommodate various load and passenger amounts. In a preferred embodiment, the deck is about 20–25 feet long and about 8 feet wide. The deck may contain ornamental graphics or a covering (e.g., waterproof coverings, rubberized coverings, carpet, etc.); furthermore protective mechanisms such as railings may be attached to the deck.

Solar Canopy

Figure 9:
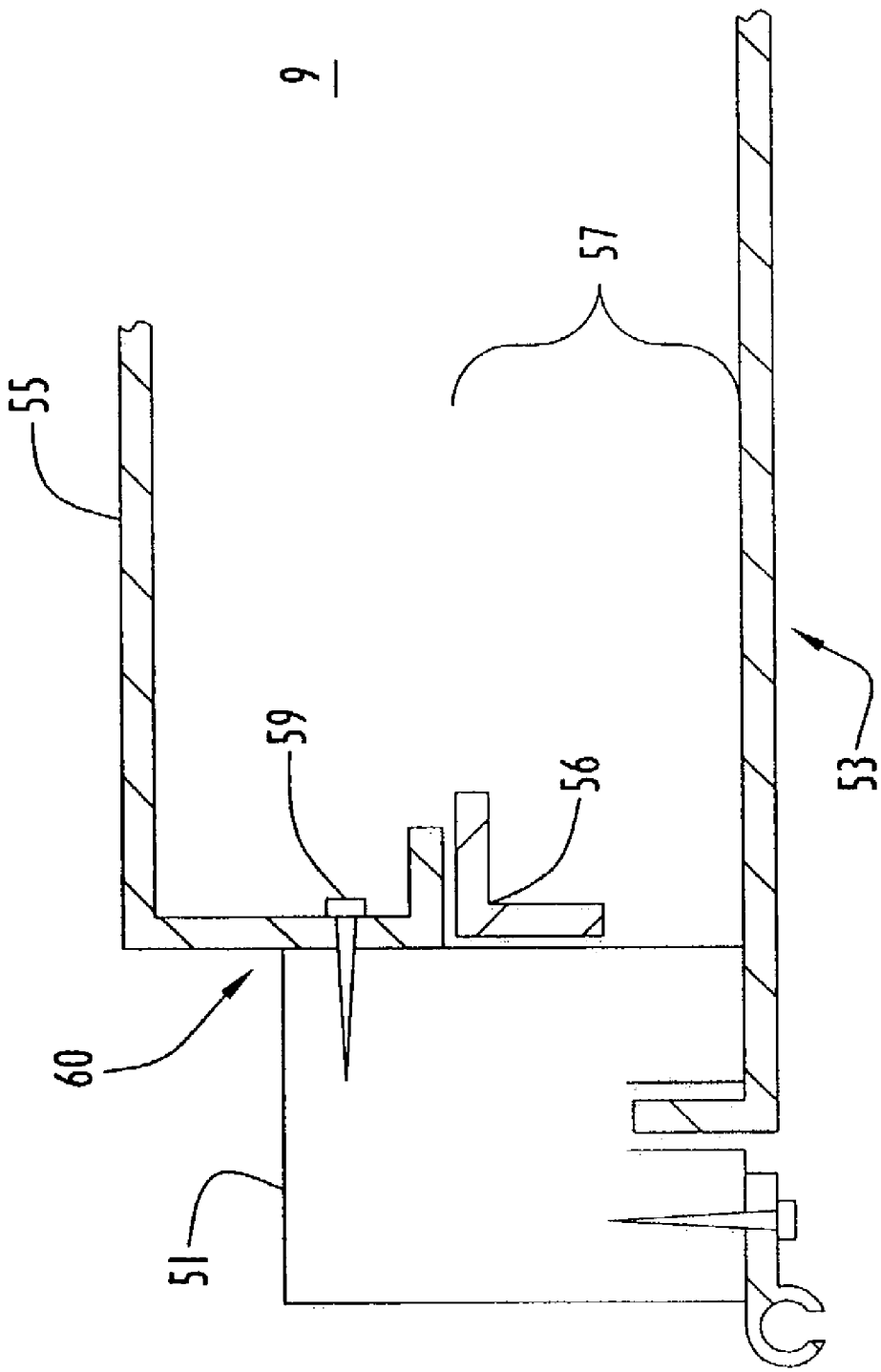
FIG. 9 is a side view in elevation showing the mounting of the canopy panel to the frame structure of the watercraft of FIG. 1.

The solar canopy houses means for receiving solar radiation (e.g., the solar panels) and means for flowing air (e.g., a ventilation systems). Additionally, it serves as a weather shield. Referring to FIG. 9, the solar canopy 9 comprises a perimeter frame 51 and, attached to frame 51, a headliner layer 53 and solar reception means 55. Preferably, the solar reception means comprises a layer of solar panels. As can be seen from the drawing, a solar panel layer 55 is attached to the upper interior portion of frame 51, and the headliner 53 is attached to the lower interior portion of frame 51. The headliner 53 is disposed substantially parallel to and in vertically spaced relation from the means for receiving solar radiation 55 to define a ventilation space between the means for receiving solar radiation 55 and the headliner 53. In other words, situated between the solar panel layer 55 and the headliner layer 53 is a ventilation space 57—a thin volume of open space that facilitates the flow of air through the canopy 9. In a preferred embodiment, the ventilation area as about 2.5 inches deep.

Canopy Frame

The canopy frame comprises a perimeter structure large enough to accommodate the desired number of solar panels that are set within it. If necessary, the frame may be reinforced using supports that run either parallel or perpendicularly to the length of the watercraft. Reinforcing supports are typically used to accommodate the weight of a plurality of panels. The interior, reinforcing supports are shorter in height than the perimeter frame, being made level with the bottom of the perimeter frame. The frame comprises a material having sufficient strength to support the solar panels. Typically, the frame comprises a coated or uncoated metal, but other materials such as wood or plastic may be used. To create a durable canopy that keeps the overall weight of the watercraft low, a preferred material is a lightweight metal such as aluminum. In one embodiment, if more than one panel section is used in the canopy, holes are provided into interior frame segments to enable the flow of air between sections. The number of holes is not essential, but should be kept low to maintain the integrity of the frame. In another embodiment, a ventilation tube may be used to provide airflow among panel sections (explained, infra). In this embodiment, tubes extend from an intake manifold and through the holes to provide airflow to other sections of the canopy. The diameter of the holes can also vary, but is preferably ⅝". The holes, moreover, are positioned near the rear of the solar panel at a distance that is no more than ⅓ the entire length of the panel. For example, if the panel length is six feet, the holes are placed within two feet as measure from the rear (aft section) of the panel.

Canopy Headliner

The headliner layer forms the lowest layer of the canopy structure (i.e., the layer closest to the deck of the watercraft). It protects the electronic components (solar panels, wiring) contained within the canopy and hides these components from a passenger's view. In addition, it prolongs the life of the headliner. The headliner may comprise any material. For example, the headliner may comprise plastic (e.g., vinyl), woven screen materials, and nonwoven web materials made of polymeric or natural fibers (e.g., spunbonded or metl-blown webs such as Reemay® (available from BBA Nonwovens, Bethune, D.C.) and Tyvek® (available from E.I. Dupont Nemours, Wilmington, Del.)). In addition, a decorative effect may be placed on the layer (e.g., graphics may be printed on either side of the headliner). The headliner is attached to the frame using an attaching means such as sewing or stapling. In a preferred embodiment, adhering means comprises a "staple-in" system. In such a system, the frame comprises an extruded tube having an open channel on one side. The headliner material is inserted and stapled directly into the channel using a pneumatic stapler that discharges a shim (typically comprising vinyl). The shim locks the material into place within the channel. This system is marketed under the trade names of Steel Stitch® and GatorStitch® (both available from Steel Stitch Corp., Kennesaw, Ga.). Regardless of the attaching means, the headliner material is set so that it is taut on the frame.

Canopy Solar Panel Layer

The means for receiving solar radiation 55 preferably comprises at least one photovoltaic (solar) module. The module (also called a panel) includes known types of solar cells, including single crystal (mono-crystalline), polycrystalline, amorphous (thin film, flexible), and hybrid amorphous/mono-crystalline cells. Preferred are mono-crystalline or polycrystalline cells because they are capable of producing the largest amount of energy. In addition, mono-crystalline and polycrystalline are non-flexible panels that can be attached directly to a supporting frame to create a durable, protective canopy (i.e., the panels actually comprise the canopy). In comparison, (amorphous) flexible panels must be attached to a backing layer such as canvas, and then attached to a frame. As a result, the canopy life is limited by the life of the material comprising the backing layer. Most preferred are mono-crystalline cells having a textured surface to maximize the absorption of direct and diffused light. One example of such a cell is the Shell® SP150 photovoltaic solar module, available from Shell Solar Industries, Camarillo, Calif.

It should be understood that the size and power output of the module(s) depends on the size and power requirements of the watercraft on which it is placed. The larger the size of the panels or their amount, the faster the recharging rate. When more than one solar module is used in the canopy, the modules may be connected in series or in parallel to accommodate the desired power requirements. For example, for a watercraft requiring an engine that operates on 24 volts, a solar module (or modules) capable of producing at least this amount of voltage is necessary.

The panels are attached to the frame using an attaching means. In the preferred embodiment shown in FIG. 9, solar panel 55 is attached to the frame using screws 59, and a waterproof sealant such as silicone caulk is used to seal the seam 60 created along the upper portion of the frame and the solar panel.

Ventilation System Contained Within Canopy

Canopy 9 houses a ventilation system that regulates the flow of air within the canopy, which, in turn, maximizes the performance of the solar panels. Heat is a byproduct of the operating characteristics of electronic controllers and solar radiation. As indicated above, it is necessary to protect the solar panels, wiring, etc., using the headliner in the canopy structure. The headliner, however, creates an insulated space that, much like an attic, traps heat. Since solar electric panels produce the highest levels of electric current at periods of cold temperature and high solar radiation, any heat trapped within the canopy will decrease the production of solar current available for the battery. Consequently, removing heat increases not only efficiency of electrical energy production, but also the rate of electrical charge of a battery system. In addition, improving the airflow through a canopy serves to prolong the life of the canopy by removing corrosion-causing moisture from the canopy.

To address these issues, a means for flowing air is housed in the canopy ventilation area. The means for flowing air preferably comprises a system including a fan. The fan, moreover, may be connected to a thermostatic switch, an intake means, and an exhaust means. The fan preferably comprises a low voltage fan. An example of a low-voltage fan is the fan type normally used in personal computers, e.g., a 12-volt, direct current fan. This fan is capable of moving air at a rate of about 32 ft$^3$/min. A series of fans may be provided, but one fan is normally sufficient to provide the desired airflow. The adjustable thermostat controls the fan, allowing it to operate at predetermined temperatures. The range of predetermined temperatures is not essential, but is typically in the range of about 90°–130° F. The fan is generally part of the intake means. The means may comprise an intake port having one of two preferred embodiments. A detailed diagram of first embodiment is provided in FIG. 10. The intake port 62 comprises a fan 64 provided with a protective screen 66 (to keep out insects). The screened fan 64/66 is then attached to a skirt layer 68. Skirt layer 68 typically comprises the same material as that comprising the headliner 53. A hole 70 having the same size as that of the screened fan 64/66 is cut into the headliner 53. Finally, the skirt/fan structure is adhered to the headliner layer 53.

FIG. 11 illustrates a second embodiment of intake port 62. The structure of skirt 68, screen 66 and headliner 53 layers remain the same as in the first embodiment; however, in this embodiment, fan 64 is housed in a manifold. The manifold comprises a box 72, e.g., a plastic electrical box, onto which fan 64 is attached. A hole or aperture 74 is defined in the side of manifold box 72 to provide air to the solar panel section where manifold box 72 is located. The diameter of the hole is not essential, but is preferable about ¼ inch. If more than one panel section is used in the canopy, tubes (not shown) are connected to manifold box 72 via the holes 74, with the tubes extending to each panel section. The tubes travel from manifold box 72 and through the frame supporting the panels via holes in the frame (discussed supra). The size of manifold box 72 must be a size sufficient to house fan 64. With the 12-volt, direct current fan discussed above, a four-inch plastic electrical box is preferred. An optional lid 73 may be provided to seal manifold box 72. Alternatively, the open-side of the manifold box may be sealed to the solar panel using a sealing agent such as silicone caulk.

The exhaust means includes an exhaust port comprising a screened aperture fitted with a reinforcing grommet. Preferably, the grommet is made of stainless steel, brass or plastic. The size of the exhaust ports may vary according to the desired rate of airflow, but typically have diameters ranging from about ½ inch to about two inches in diameter.

Figure 12:
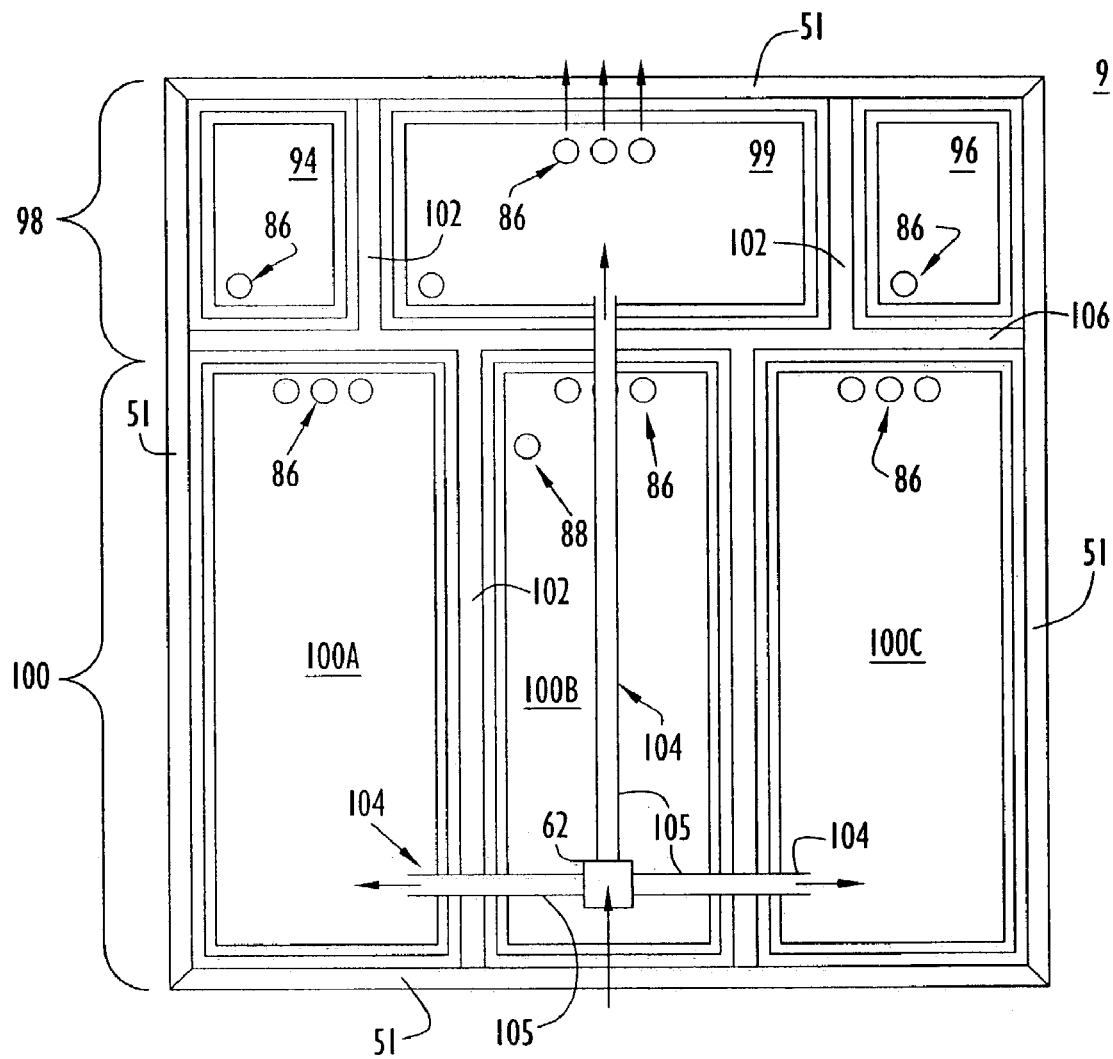
FIG. 12 is a bottom view in plan of the solar canopy of the watercraft in FIG. 1 showing the solar panel placement.

The placement of the ports improves the cooling efficiency of the ventilation system. FIG. 12 illustrates the layout of a preferred embodiment of the solar canopy underside. The canopy comprises a front (fore) portion 98 and an aft portion 100. The aft portion 100 faces the aft of the centerline of flotation. The intake 62 and exhaust 86 ports lay flush with the underside of canopy 9 (i.e., they are located in the headliner layer). In particular, intake port 62 is positioned in the center of the aft portion 100 of the canopy, while the exhaust port(s) is located toward the fore portion 98 of canopy 9. Having intake port 62 located at the rear of canopy 9 and exhaust port 86 located at the front of canopy 9 maximizes the cooling effect of the ventilation system. When the watercraft has an aft-oriented trim (i.e., a trim where the craft aft section sits lower than the fore section), the convection currents in solar canopy 9 are increased. Canopy 9 sits lower at its rear than at its front. The convection currents within the canopy ventilation area are such that the hotter air moves toward the higher, front portion of the canopy ventilation area and out through the exhaust ports. The use of a fan boosts this convection current.

Thermostatic switch 88 may be any such switch known in the art. The switch 88 is mounted such that it is accessible to a passenger. For example, the switch 88 can be accessed through an aperture in the headliner layer that is covered with an interior flap comprising the same material as that comprising the headliner. The aperture is may be reinforced with a grommet comprising, e.g., brass, plastic, or stainless steel. The location of switch 88 is not essential, but it is preferably located toward front portion 98 of canopy 9 since, as a result of the convection currents associated with an aft-oriented watercraft, warmer air will be located toward the front of the canopy. For example, it can be located at the front area of the most centrally located solar panel.

Figure 13:
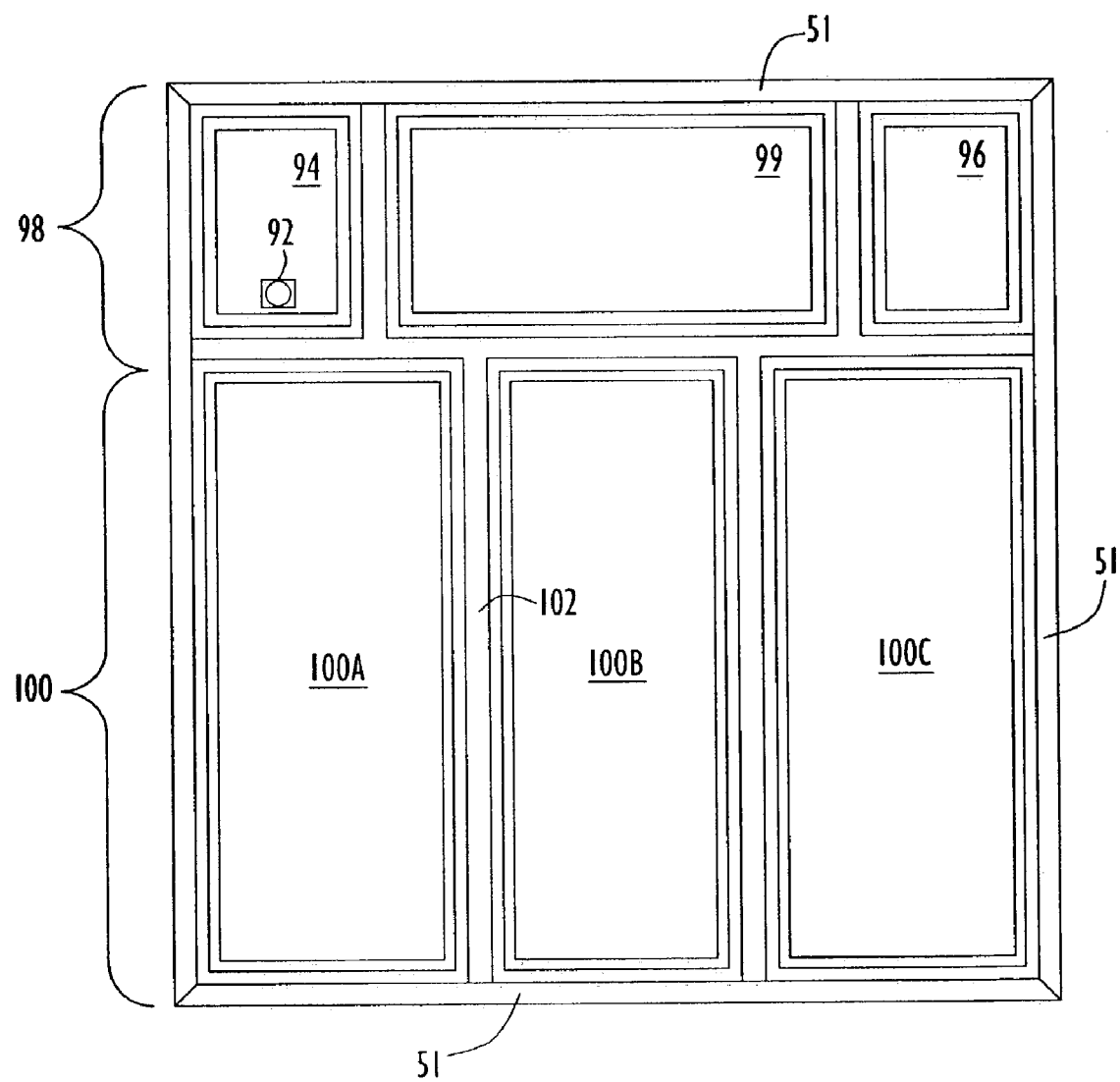
FIG. 13 is a top view in plan of the solar canopy of FIG. 1 showing the solar panel placement.

As an additional energy-saving mechanism, switch 88 may be controlled by an activating means. For example, the means may comprise a normally closed photocell. The photocell cuts power to the switch 88 whenever insufficient sunlight is present (e.g., during night conditions). The photocell is conventional and is known to those having ordinary skill in the art. FIG. 13 shows a top view of canopy 9. Photocell 92, connected in series with switch 88, is located in either of the sheet blank areas 94, 96 on the side of canopy 9 exposed to the sun (i.e., on the upper, solar-paneled side). Photocell 92 can be opened or closed, but is normally closed to conserve energy.

Figure 14:
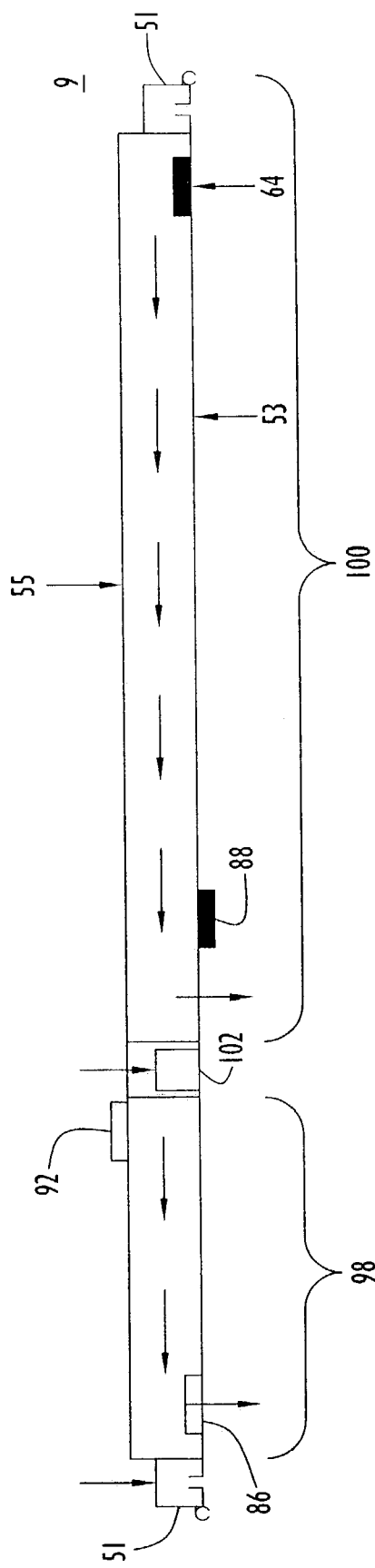
FIG. 14 is a flow diagram showing the movement of air through the solar canopy ventilation area.

The system operates in the manner illustrated in FIG. 14. High solar radiation produces current appropriate for battery charging. As production increases, so do heat levels. Photocell 92 remains active during sunlight hours. Thermostat 88, enabled by photocell 92, operates fan 64 (which is part of intake port 62) when a predetermined temperature is reached. Fan 64 draws cooler air from below the rear portion of the canopy headliner. Fan 64 propels the air in the manner indicated by the arrows through the aft and fore portions of the canopy 98, 100. The air is distributed through holes (not shown) cut into reinforcing frames 102. Since this mechanically propelled, cooler air is more dense than any heated air existing within the canopy, the cooler air forces the heated air along the underside of the solar panel. Finally, the heated air is pushed out through exhaust ports 86. The resulting drop in temperature increases the production of current and extends the life of the headliner material.

As discussed earlier, in the embodiment where the intake port comprises a manifold system, the fan is housed in a box. As seen in FIG. 12, tubes 104 located in the ventilation area extend from the intake port to the frame segments of adjoining panel sections 99, 100a, 100b, 100c. Tubes 104 fit through holes 105 provided into the interior frames, discussed supra. The material comprising the tubes is not limited, preferably comprising a plastic such as polyvinyl chloride. The diameter of the tubes can be adjusted to increase or decrease the flow of air. A preferred diameter is about ½ inch. Fan 64 of the intake port 62 propels air through tubes 104, directly into each section 99, 100a, 100c. The hot air is again pushed through the ventilation areas of the solar panel sections and exits from the exhaust port.

Preferred Embodiment of Solar Canopy

The preferred embodiment illustrated in FIG. 12 will be discussed to further illustrate the solar canopy layout. In this embodiment, solar canopy 9 is a square block having sides approximately eight feet long. Four rectangular solar panels 99, 100a, 100b, 100c are used to form the canopy. Panels 99, 100a, 100b, 100c comprise Shell® SP150 Photovoltaic Solar Modules. These modules have a length of 1622 mm (5.32 ft) and a width of 814 mm (2.67 ft). As can be seen from the figure, the frame comprises a rectangular perimeter 51 and the two interior sections discussed earlier: the aft section 100 including three solar panels 100a, 100b, 100c running parallel to the length of the watercraft and the front section 98 including a single solar panel 99 running perpendicularly to the length of the watercraft. On either side of single solar panel 99 are blank areas 94, 96 comprising headliner material. Fore 98 and aft 100 portions are divided by a large reinforcing support 106 running perpendicularly to the length of the watercraft connecting the starboard and port sides of perimeter frame 51. Both sections 98, 100 are further divided by shortened reinforcing supports 102 running parallel to the length of the watercraft, connecting large reinforcing support 106 to the aft portion of perimeter frame 51. As can be seen from the diagram, panels 100a, 100b, 100c of the aft portion 100 are set edge-to-edge with each other on top of the shortened reinforcing supports 102. A waterproof sealant such as silicone caulk may be used to seal the frame/panel joints. Intake port 62 is located at the rearmost portion of the rear section's center panel 100b, while the exhaust ports are located at the frontmost portion of those panel sections not housing the intake port (i.e., 99, 100a, 100c).

Referring to FIG. 9, the interior of the solar panel is further illustrated. It can be seen that the solar panel 55 is attached to a staple-in perimeter frame 51 via a screw 59, with panel 55 protruding slightly (e.g., about ⅝ of an inch) above frame 51. Panel 55, moreover, is reinforced with an aluminum angle iron 56 spot welded to both panel 55 and frame 51. The height of frame 51 is approximately two inches, and its width is approximately 1.5 inches.

Power System

The power system includes means for transferring energy from the solar reception means to at least one battery pack. The phrase "battery pack" is intended to include a single battery or a plurality of batteries connected in series or in parallel, wherein the single or plurality possesses a variety of voltage capabilities. The battery pack is stored in a battery box optionally stored in a battery bay (discussed supra). The energy transferring means preferably comprises a control console is located on the deck of the watercraft, with connection wires typically running through the canopy supporting means and into the console. FIG. 15 illustrates the power system. The exterior of the deck-mounted control console 110 comprises a louvered grill 111 with a screen. Console 110 houses a charge controller (not shown) and other heat-generating products (e.g., DC to AC converters, fuses, transformers, entertainment devices (stereos) and GPS devices). The type of charge controller is not particularly limited, but preferred is a controller disclosed by U.S. Pat. No. 6,111,391, the entire contents of which are incorporated herein by reference. This charge controller is sold by RV Power Products Inc., Vista, Calif. Since the recharging cycle of the charge controller generates heat, and since heat decreases the efficiency of the controller, removing heat increases the controller's efficiency. Consequently, control console 110 comprises a means for ventilating air. The ventilation means preferably comprises a system including a fan connected in circuit with the thermostatic switch of the canopy. The fan preferably comprises a low voltage fan. As an example, the fans may be identical to the fan used in the canopy ventilation system. Though only one fan is necessary to provide the minimum level of airflow, providing two fans allows the system to function in case one fan should fail. More fans may be provided to increase the rate of airflow. As can be seen in FIG. 15, the console comprises a Y-shaped fitting 114. Within each spoke 116 of fitting 114 is a fan 112. Fitting 114 is connected to a single pipe 118 that exits through the bottom of console 110 between the bottom of the deck (not shown) and the top of the pontoon section (not shown). Positive and negative battery wires 115 connecting the entire system to the battery packs also run through pipe 118. Pipe 118 connects to a splitter pipe 120 that divides the line to deliver air into each battery box 40. The divided pipes 122 enter battery box 40 through the air inlet port 46 located at the rear or interior rear side of each box 40. The front or exterior front side of each box 40 has an air exhaust port 48 comprising a one-way valve that allows exhaust air to exit, but prevents water from entering box 40.

Figure 16:
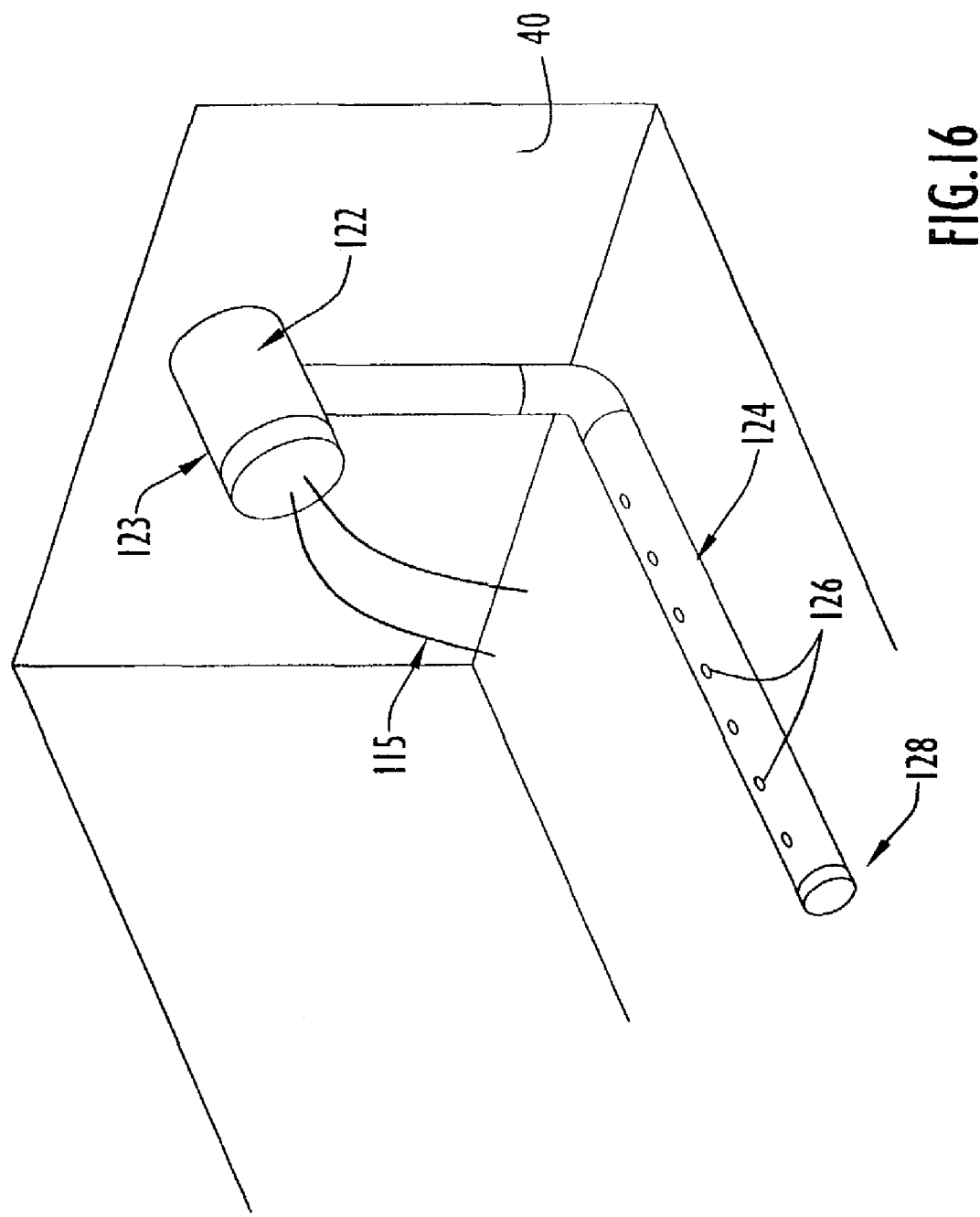
FIG. 16 is a flow diagram of the manifold ventilation system of the battery bays.

FIG. 16 shows a detailed view of the preferred embodiment of the battery box ventilation system. This system is preferred when the battery box having an internal configuration is used. As can be seen, the ventilation system comprises a manifold. Divided pipe 122 extends into box 40 via the air inlet port 46. Pipe 122 is capped so that the air is directed through a manifold pipe 124. Cap 123 contains apertures through which battery wires 115 protrude and connect to any battery packs (not shown) located in box 40. Preferably, the battery packs are set on either side of manifold pipe 124 (not shown). Manifold pipe 124 runs along the interior of the rear side of box 40 (i.e., the side containing the inlet port) and down to the floor of box 40. Manifold pipe comprises holes 126 directed toward the lid of the box (not shown). The manifold pipe is capped 128 at its terminal end to force the air through holes 126. The material comprising any of the piping may be any material that is corrosion resistant. A preferred example is chlorinated polyvinyl chloride (CPVC). The size of the pipes is not limited, with the main piping 118, 122 having a preferred diameter of about two inches, and the manifold piping having a preferred diameter of about ⅜ inch. It is important to note that battery posts and vent caps must be set higher than the bottom of the air exhaust port. Submerged batteries in the box develop a destructive electric current when the solar panel is activated. In the unlikely event that the battery box becomes flooded with rainwater, the water will flow out of the box before covering the posts.

The operation of the power/ventilation system is best seen in FIGS. 15 & 16. Batteries charge at a higher rate under conditions of high radiation and efficient controller operation. Heat is created during the charging cycle. The battery pack, however, is charges faster in cooler conditions. When activated by thermostatic switch 88, fans 112 draw cooler, outside air into control console 110 through louvered grill 111. As indicated by the arrows, this cool, dense air pushes the heated air through pipes 118, 122 that empty into each battery box 40. The air is pushed through manifold pipe 124 and out holes 126. The air then travels over the battery pack (not shown), and exits the front of box 40 via exhaust port 48. This system creates a more efficient battery-charging environment by not only removing the heated air from control console 110 (thus improving the efficiency of the charge controller), but also reducing the corrosive effect and the explosive potential of any fumes collected in battery box 40 (by pushing the fumes out of the box). The system, moreover, cools the batteries. Since the rate of charge of a battery decreases with increased temperatures, the ventilation also increases the efficiency of the batteries. Using the internal mounting configuration discussed above improves the cooling efficiency further, since the water surrounding the pontoon section keeps the battery box cool.

The power system of the present invention is "inverter-capable"; that is, it can power various appliances. Since the inventive pontoon configurations (FIGS. 5a, 5b, 5c, and 5d) enable one to use heavier battery designs (when compared to deck mounted boxes), the current system can easily power remote tents, campsites or cabins, television sets, refrigerators, power tools, lamps, etc.

The battery pack for the pontoon boat may be the type conventionally used to power watercrafts. A preferred battery is a lead-acid battery. Due to the use of the above-mentioned battery box, many battery configurations—even those of high weight—can be used (e.g., 6, 12, 24, 36, 48 and 60 volt configurations) without losing deck space or creating undesired trim. The amount of voltage must be sufficient to propel a craft of a given size. Generally, increasing the voltage increases the horsepower obtainable from an electric motor. In a preferred embodiment, eight 6-volt batteries are configured to provide about 48 volts. In a particularly preferred embodiment, eight 6-volt Trojan® 16HC 395 amp lead-acid batteries are used. These batteries possess an approximate weight of 968 lbs.

The motor can be any of many known in the art. For example, it may comprise an electric outboard, a gas outboard, or a trolling motor. The size of the motor depends on the size of the watercraft. Preferably, the motor provides at least about 90 lbs of thrust power. The preferred motor is an electric outboard. A particularly preferred electric outboard provides a minimum horsepower rating of about four.

The disclosed battery box and configurations related to it may be installed into any pontoon watercraft to provide the craft with the benefits of increased battery storage, improved charging efficiency, and improved trim and craft stability. For example, the battery box may be installed into a watercraft that has a gas outboard motor, but uses a battery pack to run peripheral components. Gas-powered crafts would still benefit from the innovative battery box design, namely, from the improved deck space, battery ventilation, shock risk reduction, and aft-orientation stability advantages. In addition, a gas-powered craft could utilize the solar panel system as a generator for the craft's electrical power system.

The novel watercraft of the instant invention improves the battery longevity and capabilities of pontoon watercrafts currently available. Each of (1) removing heat from the canopy, (2) exhausting heat and gas from the battery area, (3) improving the trim and craft stability, and (4) reducing water drag on the pontoon section provides an improvement over the state of the art by improving charging efficiency, improving charge retaining properties, or decreasing the battery drain on the watercraft. It should be clear that when more than one of these innovations is provided on a watercraft, the beneficial effects are cumulative. Additionally, the innovative pontoon designs not only improve the trim of the watercraft, but also maximize deck space.

The electric watercraft of the present invention is truly maintenance free, cost effective, and capable of providing quiet cruising. Since the craft is fully electric, it eliminates delays due to low gasoline or poor fuel mix. The invention also eliminates the inconveniences of smell of fuel on hands, grease/oil on clothing, and the need to annual winterize the craft. Since the craft is continuously recharged, this invention further avoids the inconvenience of delays caused by a dead battery, and negates the need for public utility AC current and electric cords, which frees the user from reliance of recharging only where adequate AC power is available. Battery longevity is increased because the electricity is available to charge the controller during sunlight hours. In addition, it lessens the risk of electrocution not only because the power system eliminates the need to connect to an electric charger while on the water, but also because the battery location minimizes the risk of passenger contact with the battery pack.

Having described preferred embodiments of a novel solar charged, electric driven watercraft, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A solar-powered watercraft comprising:
a craft body including a deck;
at least one pontoon having a centerline of flotation, said pontoon being disposed in depending relation from said body and comprising first and second sides, a forward terminal end toward which said sides taper and intersect at a forward terminal edge oriented perpendicularly to said deck, an intermediate portion, and an aft terminal end toward which said sides taper and intersect at an aft terminal edge oriented perpendicularly to said deck;
a canopy secured to said body and disposed above said deck, wherein said canopy includes means for receiving solar radiation;
at least one battery pack for powering said watercraft, wherein said pack is secured to said pontoon; and
means for transferring energy from the solar reception means to the battery pack;
wherein the canopy further comprises a headliner disposed substantially parallel to and in vertically spaced relation from the solar reception means to define a ventilation space between the solar reception means and the headliner, and wherein the canopy further includes means for flowing air through the ventilation space comprising a fan connected in circuit to a photocell.

2. The watercraft of claim 1, wherein the battery pack is mounted on an exterior surface of the pontoon.

3. The watercraft of claim 1, wherein the battery pack is mounted at least partially inside the pontoon.

4. The watercraft of claim 1, wherein said solar reception means comprises at least one solar panel.

5. The watercraft of claim 4, wherein the solar panel comprises a non-flexible monocrystalline or polycrystalline module.

6. The watercraft of claim 1, wherein
said forward terminal end defines a water-cutting edge;
said intermediate portion includes the centerline of flotation; and
said sides at said aft terminal end taper both rearward and downward to converge to said aft terminal edge.

7. The watercraft of claim 1 further comprising means for containing the battery pack located near the flotation centerline.

8. The watercraft of claim 7, wherein the battery pack containing means comprises means for air inlet and means for air outlet.

9. The watercraft of claim 1 wherein the means for transferring energy from the solar reception means to the battery pack comprises a control console secured above the deck.

10. The watercraft of claim 9, wherein the control console comprises means for ventilating air.

11. The watercraft of claim 10, wherein the air ventilation means comprises a fan connected in series to a thermostatic switch.

12. The watercraft of claim 1, wherein the watercraft possesses an aft-oriented trim at rest or in motion.

13. A pontoon for a watercraft comprising
a forward terminal end;
an intermediate portion including a vertical centerline of flotation, the centerline of flotation comprising a point along the pontoon located halfway between a forward point where the diameter is 75% of the full pontoon diameter and an aft point where the diameter is equal to or greater than 80% of the full pontoon diameter;
an aft terminal end; and
a bay configured to receive battery containing means.

14. The pontoon of claim 13, wherein the pontoon bay intersects the centerline of flotation.

15. The pontoon of claim 14 further including battery containing means secured to the battery bay.

16. A pontoon for a watercraft comprising
a first side and a second side;
a forward section having a terminal end;
an intermediate section including a flotation centerline;
an aft section having a terminal end; and
means for containing at least one battery pack secured to the intermediate section;
wherein, at said aft terminal end, said sides include a downward taper and a rearward taper converging and intersecting at an edge.

17. The pontoon of claim 16, wherein the battery pack containing means is mounted on the exterior surface of the pontoon.

18. The pontoon of claim 16, wherein the means for containing a battery pack is mounted at least partially inside the pontoon.

19. The pontoon of claim 16, wherein the battery pack containing means comprises means for air inlet and means for air outlet.

20. The pontoon of claim 16, wherein the battery pack containing means intersects the flotation centerline.

21. A solar-powered watercraft comprising
a craft body including a deck;
at least one pontoon secured in depending relation from said body, said pontoon including
  a centerline of flotation oriented perpendicular to said deck,
  a bay comprising a recessed surface area on the pontoon, said bay positioned to intersect the centerline of flotation,
  battery containing means at least partially positioned within said bay, said battery containing means including a means for air inlet and a means for air outlet;
a canopy secured to said body and disposed above said deck, wherein said canopy includes means for receiving solar radiation;
at least one battery pack for powering said watercraft, wherein said pack is contained within said battery containing means; and
means for transferring energy from the solar reception means to the battery pack.

22. The watercraft of claim 21, wherein the centerline of flotation is a point along the pontoon located halfway between a forward point where the diameter is 75% of the full pontoon diameter and an aft point where the diameter is equal to or greater than 80% of the full pontoon diameter.

23. A solar-powered watercraft comprising
a craft body including a deck;
at least one pontoon secured in depending relation from the body, the pontoon including
a container configured to house a battery pack, and
a bay configured to receive the container, wherein the container is secured to the bay;
a battery pack housed in the container;
a canopy secured to said body and disposed above said deck, said canopy including a panel operable to receive solar radiation; and
a control console operable to transfer energy from the solar panel to the battery pack;
wherein the control console further includes a ventilator configured to ventilate the battery pack container and the control console.

24. A solar-powered watercraft comprising
a craft body including a deck;
at least one pontoon secured in depending relation from said body;
a canopy secured to said body and disposed above said deck, wherein said canopy includes
  a frame comprising an open channel;
  a headliner attached to the frame channel; and
  a panel configured to receive solar radiation attached to said frame and disposed substantially parallel to and in vertically spaced relation from the headliner to define a ventilation space between the panel and the headliner, said panel positioned above the headliner such that the panel comprises the layer furthest from the deck;
a battery pack that powers the watercraft; and
a control console operable to transfer energy from the panel to the battery pack.

25. The watercraft of claim 24, wherein the canopy further includes means for flowing air through the ventilation space comprising a fan connected in circuit to a photocell, said photocell configured to make inoperable the fan when insufficient sunlight is present.

26. A solar-powered watercraft comprising:
a craft body including a deck;
at least one pontoon disposed in depending relation from the body and comprising first and second sides,
  a forward terminal end toward which the sides taper and intersect at a forward terminal edge oriented perpendicularly to the deck, wherein the forward terminal end defines a water-cutting edge,
  an intermediate portion comprising a centerline of flotation, and
  an aft terminal end toward which the sides taper rearward and downward to intersect at an aft terminal edge oriented perpendicularly to the deck;
a canopy secured to the body and disposed above the deck, wherein said canopy is operable to receive solar radiation;
at least one battery pack for powering the watercraft, wherein the at least one battery pack is secured to the pontoon; and
means for transferring energy from the solar reception means to the battery pack.

* * * * *